Dec. 16, 1930.  W. T. POWLING  1,785,361
APPARATUS FOR RECOVERY OF FATS, OILS, OR OLEAGINOUS
SUBSTANCES FROM MATERIALS YIELDING THEM
Filed Jan. 13, 1927
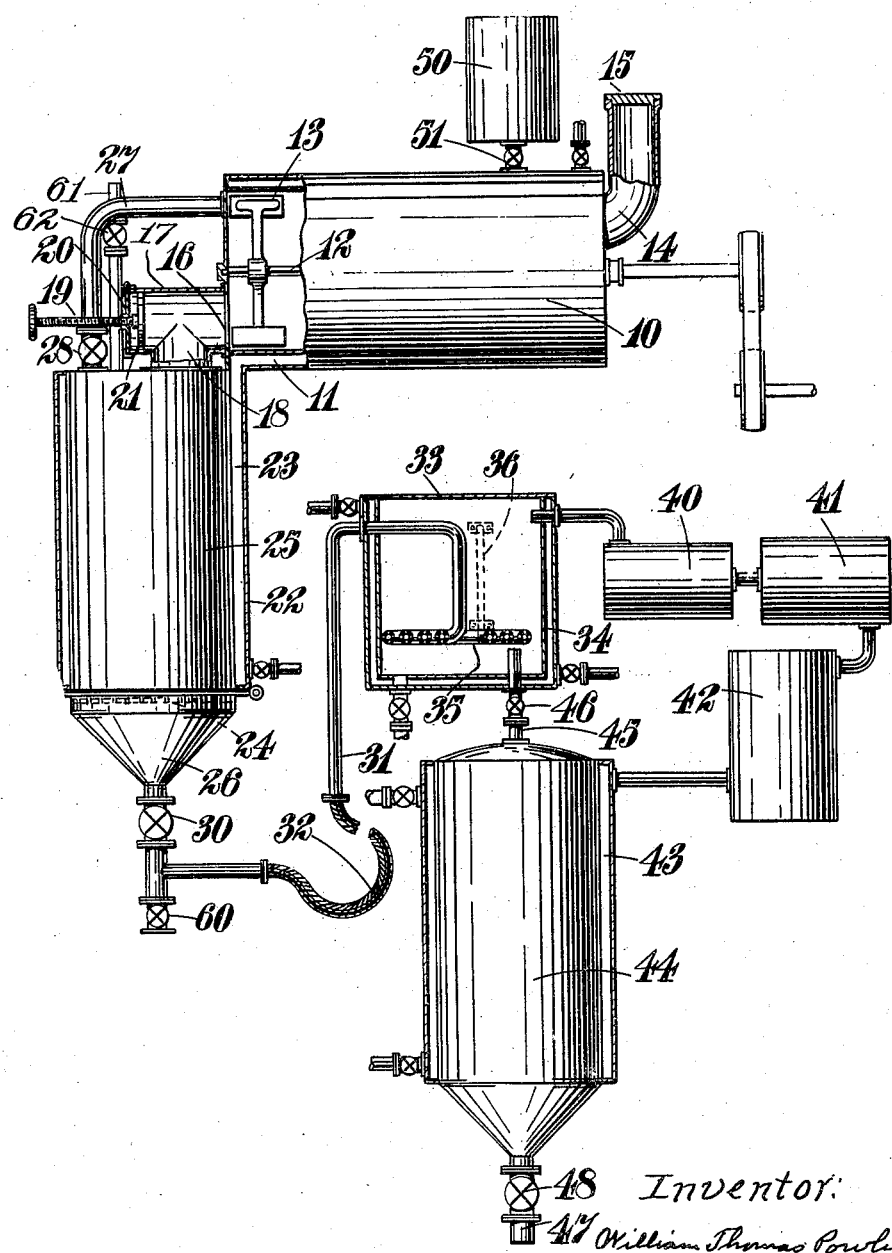
Inventor:
William Thomas Powling
By Byrnes, Stebbins & Parmelee,
attys.

Patented Dec. 16, 1930

1,785,361

UNITED STATES PATENT OFFICE

WILLIAM THOMAS POWLING, OF LONDON, ENGLAND, ASSIGNOR TO JOHN WILLIAM PITTOCK, OF PHILADELPHIA, PENNSYLVANIA

APPARATUS FOR RECOVERY OF FATS, OILS, OR OLEAGINOUS SUBSTANCES FROM MATERIALS YIELDING THEM

Application filed January 13, 1927, Serial No. 160,834, and in Great Britain January 29, 1926.

This invention relates to the recovery of fats, oils or oleaginous substances (hereinafter denoted generically for the sake of brevity by the expression "fats") from materials containing such substances. The invention is concerned with the well-known process of dry-rendering in which the materials to be treated for the recovery of the fat to be yielded by them are first submitted to the action of heat so as to melt down the fat and drive off the aqueous components of the materials, after which the liberated fat is allowed to drain from the solid residuals of the melting-down operation, and finally the fat which has not drained away from said residuals is extracted therefrom by some convenient means. Generally these means have comprised hydraulic filter presses, expellers and centrifugal separators, all of which are expensive forms of apparatus and incur in their operation very considerable labour, working and maintenance costs.

In my concurrently filed application, Serial No. 160,833, I have described an improved process of the above general type which comprises in combination, the steps of melting-down and subsequently subjecting the cracklings to the direct action of hot vapour so as to facilitate the extraction of their fat-content. The hot vapour of said improved process could be the vapour of water or, according to a specific feature of the process, extraneously supplied steam preferably extraneously supplied steam under pressure.

According to a further specific feature of said improved process, the latter consisted in melting-down a batch of fat-yielding material and concurrently passing the hot vapours produced through cracklings of a previously melted-down batch of material so as to facilitate the extraction of fat therefrom.

Another feature still of the improved process resided in this, that the whole of the operations of melting-down and transference of the resulting cracklings to a fat-extractor, extracting the fat from the cracklings in the extractor, and recovering the extracted fat, were effected in such manner that the material was at no time exposed to the atmosphere and that the vapours produced during the process were collected and so disposed of as to prevent nuisance in the vicinity of the plant by foul-smelling odours.

The present invention has for its object to provide an improved form of apparatus for carrying into effect a dry-render process as described in my said concurrent patent application.

According to the present invention, apparatus for dry-render recovery of fat from fat-yielding materials, comprises, in combination, a closed rendering vessel or degreaser, a closed draining vessel (hereinafter referred to as the "closed vessel" as distinguished from the "degreaser") to receive cracklings discharged from the degreaser, a controlled air-sealed passage between the degreaser and said closed vessel for the discharge of cracklings at will from the one to the other without exposure to the atmosphere, means to generate or provide a supply of hot vapour, means to admit said vapour at will to the closed vessel, a vapour-exit in said vessel so situated that the hot vapours admitted have to travel through the body of cracklings in the vessel, and means to "collect" the vapours at said vapour-exit. The expression "to collect" has been employed to denote any convenient step of so disposing of the vapours that they are prevented from causing a nuisance by contaminating the atmosphere in the vicinity of the plant. For example, the vapours could be withdrawn from the cracklings and discharged into the upper layers of the atmosphere by means of a suitable flue, or they could be discharged into a drain or into a body capable of absorbing the foul-smelling gases. Any, or all, of these means or their equivalents is intended to be included within the scope of this invention and to be covered by the expression "means to collect the vapours."

There may be combined with the elements set forth in the preceding paragraph, means to collect fat extracted from the cracklings in the said closed vessel.

According to a feature of the invention the apparatus comprises, in combination, a closed degreaser, a closed vessel to receive cracklings discharged from the degreaser, means placing said degreaser and vessel in controlled air-sealed communication with one another, so that at the conclusion of a melting-down operation cracklings can be discharged at will and without exposure to the atmosphere from the degreaser to the closed vessel and thereafter during a following melting-down operation the hot vapours produced in the degreaser can be passed at will to the closed vessel, a vapour-exit in the closed vessel so situated that the hot vapours admitted from the degreaser have to travel through the body of cracklings in the vessel, and means to collect the vapours at said vapour-exit.

According to a further feature of the invention, suction means may be provided to promote the flow of hot vapour through the body of cracklings in the said closed vessel of the apparatus.

According to a further feature of the invention the apparatus comprises in combination a closed degreaser, a closed vessel to receive cracklings discharged from the degreaser, a closed fat-collector, means placing these three elements in air-sealed series connection with one another so that at the conclusion of a melting-down operation cracklings can be discharged at will and without exposure to the atmosphere from the degreaser to the closed vessel and hot vapours produced in the degreaser during a following melting-down operation can be passed at will into said closed vessel and withdrawn therefrom at will along with extracted fat into the fat-collector, a vapour-exit in the fat-collector, and means to "collect" the vapour at said vapour-exit.

Other features of novelty will be referred to in the following description of one method of carrying the invention into effect, and will be severally claimed in the statement of claim appended to the specification.

In order that the invention shall be better understood, the following is a description of one embodiment of the invention given by way of example and referring to the drawing accompanying this specification.

The apparatus illustrated in the drawing comprises a degreaser or rendering vessel 10, a fat-extractor or draining vessel 25, a fat-settling tank 33 replete with a level gauge 36, a vacuum pump 40, a deodorizer 41, a jet-condenser 42 and a fat-cooler 44, all connected in series by air-sealed conduits and passages so that the system is virtually an enclosed one in which the materials and the vapours produced therefrom are at no time exposed to the atmosphere.

The degreaser 10 and the extractor 25 are jacketed as shown at 11, 23 to receive a heating medium which may conveniently be steam, or, if desired, hot combustion gases or vapours according to convenience. The jackets of the two vessels may be placed in open communication with one another as indicated in the drawing, so that the heating medium first of all circulates through one jacket after which it passes through the other.

The degreaser 10 is provided with a rotary agitator 13 carried upon a horizontal shaft 12. The function of this agitator is to maintain the contents of the degreaser in a state of continual agitation and also to distribute said contents around the interior surface of the degreaser.

The degreaser is provided at one end with a feed-hopper 14 closed by a tight-fitting closure member 15, and at the other end with two outlets, one of which, 16, is controlled by a valve 21 operating in a casing 17 and moved so as to control the outlet 16 by an operating member 19. The valve casing 17 has a downwardly directed branch 18 which leads into the top of the extractor 25, so that when a degreasing operation in the degreaser 10 has been completed, the valve 21 may be opened and the contents of the degreaser—both cracklings and liberated fat—allowed to pass directly into the extractor.

The degreaser is also provided with a vapour discharge outlet conduit 27 leading from the upper part of the degreaser, as shown, to the top of the extractor 25. The conduit 27 is controlled by a valve 28.

The extractor 25 is divided horizontally by a grid 24 into an upper portion 22 and a lower portion 26. The two portions of the extractor are hinged together at a level approximate to the level of the grid 24 as shown, so that the lower portion may be swung downwardly to enable the extractor to drop its crackling content which normally rests upon the grid 24.

The bottom portion 26 of the extractor communicates with the fat-settling tank 33 by a conduit 31 having a flexible section 32 and controlled by a valve 30. The conduit 31 leads, as shown, into the interior of the fat-settling tank and down to the bottom thereof where it terminates in a horizontal coil provided with perforations.

The upper part of the fat-settling tank 33 communicates with the inlet of the pump 40 and the bottom of the fat-settling tank communicates with the crown of the fat-cooler 44 by a conduit 45 controlled by a valve 46. The fat-settling tank 33 is jacketed with a jacket 34 to receive any convenient heating medium, so as to preserve the liquidity of the fat. The other connections need no description but will be clear from the drawing.

A live steam supply connection from any convenient source of live steam leads into the upper part of the extractor 25 as shown at 61, and the supply of steam is controlled by a valve 62.

The operation of the apparatus is, briefly, as follows:—

While a melting-down operation is proceeding in the degreaser 10 with the valve 21, of course, in its closed position, the vapours produced in the degreaser are allowed to flow, via the conduit 27, through a charge of cracklings resting upon the grid 24 in the extractor 25 and on through the conduit 31 into the fat-settling tank along with fat which all the time is being extracted from the cracklings. The action of the hot vapours is, as stated in the specification of my aforesaid concurrent patent application, to facilitate the extraction of fat from the cracklings. The vapours undergo partial condensation, and the condensate collects in the bottom of the fat-settling tank while the extracted fat rises and collects at the top of the condensate. Any uncondensed vapours in the fat-settling tank proceed, by way of the vacuum pump, into the deodorizer 41 where, as far as possible, they are deodorized and thence into the condenser 42, where they are subjected to condensation. The condensate and any still uncondensed vapours pass through the jacket of the cooler 44 and thence into a drain.

It will be appreciated from the description of the apparatus given that there is no escape of vapours from beginning to end of the apparatus and, as previously stated, this is an important feature of novelty characterizing this invention.

When the extraction of fat from the cracklings in the extractor 25 has been carried to an economic limiting degree, the extractor is opened by swinging downwardly the lower portion 26 from the upper portion 22. It will be found that the cracklings thus discharged from the extractor contain but a small percentage of fat and, moreover, are not impregnated with water but are practically as dry as they were at the conclusion of the melting-down operation by which they were produced.

In order to enhance the extraction of fat from the cracklings in the extractor 25, the cracklings may be subjected to the direct action of live steam supplied under pressure, say a pressure of between 30 and 40 pounds per square inch, the steam being admitted, as aforesaid, by way of the conduit 61 and control valve 62 after the operation of passing the hot degreaser vapours through the cracklings. If desired, the steam may be passed through the cracklings simultaneously with the degreaser vapours. It is found in general that the extraction of fat may be carried considerably further by subjecting the cracklings to the direct action of steam in this manner.

The pressure conditions in the apparatus may be varied at will according to circumstances and convenience. As previously stated, the steam may be supplied at a pressure of between 30 and 40 pounds per square inch. As to the pressures obtaining in the various elements of the apparatus during a degreasing operation and the concurrent passage of degreaser vapours through cracklings in the extractor 25, it will in some cases be found desirable to place the degreaser into free communication with the extractor and to create a partial vacuum in the system by means of the pump 40. By thus operating, the flow of vapours through the cracklings may be increased, and as will at once be understood, it will generally be desirable to operate in this manner towards the close of a degreasing operation when the rate of production of vapours is small compared with the rate obtaining during the early part of a degreasing operation. On the other hand, it may be sometimes desirable only periodically to open the valve 28, thus allowing the pressure in the degreaser to rise and suddenly releasing the compressed vapours into the extractor 25. A spasmodic rush of vapours through the cracklings has been found in some cases to have an enhanced fat-extracting effect upon the cracklings.

Sometimes it is desirable to introduce a small quantity of solvent, such as benzene. This may be introduced into the degreaser, and for this purpose the latter is provided with a reservoir 50, the outlet into the degreaser of which is controlled by a valve 51. Alternatively, and in some cases preferably, the solvent may be introduced into the extractor.

As will be appreciated, the volume of the original material introduced into the degreaser will be much reduced during the process of dry-rendering. Consequently, the extractor 25 if, as shown, of approximately the same size as the degreaser, will be capable of containing several independent charges of cracklings from the degreaser. This arrangement is a convenient one in that it permits of the carrying into effect of a series of degreasing operations extending, say, over a long period of, for example, a whole day, allowing the vapours all the while to pass through the cracklings in the extractor 25 which, during the succession of degreasing operations, gradually increases in volume and at the end of the day of subjecting the charge of cracklings to the direct action of live steam, the degreaser, during this step, being out of action.

I claim:

1. Apparatus for dry-render recovery of fat from fat-yielding materials, comprising, in combination, a closed rendering vessel, a closed draining vessel to receive cracklings discharged from the rendering vessel, a controlled air-sealed passage between the rendering vessel and the draining vessel for the discharge of cracklings at will from the one to the other without exposure to the atmosphere, a vapour passage between the rendering vessel and the draining vessel, a vapour-exit in the draining vessel so situated that the hot vapours admitted have to travel through the body of cracklings in the draining vessel, and means to "collect" the vapours at said vapour-exit.

2. Apparatus for dry-render recovery of fat from fat-yielding materials, comprising, in combination, a closed rendering vessel, a closed draining vessel to receive cracklings discharged from the rendering vessel, a controlled air-sealed passage between the rendering vessel and the draining vessel for the discharge of cracklings at will from the one to the other without exposure to the atmosphere, a vapor passage between the rendering vessel and the draining vessel, means for admitting steam to the draining vessel, a vapour-exit in the draining vessel so situated that the hot vapours admitted have to travel through the body of cracklings in the draining vessel, means to "collect" the vapours at said vapour-exit, and means to collect fat extracted from the cracklings in the draining vessel.

3. Apparatus for dry-render recovery of fat from fat-yielding materials, comprising, in combination, a closed rendering vessel, a closed draining vessel to receive cracklings discharged from the rendering vessel, means placing said rendering vessel and draining vessel in controlled air-sealed communication with one another, a vapour-exit in the draining vessel so situated that the hot vapours admitted from the rendering vessel have to travel through the body of cracklings in the draining vessel, and means to collect the vapours at said vapour-exit.

4. Apparatus for dry-render recovery of fat from fat-yielding materials, comprising, in combination, a closed rendering vessel, a closed draining vessel to receive cracklings discharged from the rendering vessel, a controlled air-sealed passage between the rendering vessel and the draining vessel for the discharge of cracklings at will from the one to the other without exposure to the atmosphere, a vapour passage between the rendering vessel and the draining vessel, a vapour-exit in the draining vessel so situated that the hot vapours admitted have to travel through the body of cracklings in the draining vessel, means to "collect" the vapours at said vapour-exit, and suction means to promote the flow of hot vapour through said body of cracklings.

5. Apparatus for dry-render recovery of fat from fat-yielding materials, comprising, in combination, a closed rendering vessel, a closed draining vessel to receive cracklings discharged from the rendering vessel, means placing said rendering vessel and draining vessel in controlled air-sealed communication with one another, a vapour-exit in the draining vessel so situated that the hot vapours admitted from the rendering vessel have to travel through the body of cracklings in the draining vessel, means to collect the vapours at said vapour-exit, and suction means to promote the flow of hot vapour through said body of cracklings.

6. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, a vapour-exit in the fat-collector, and means to "collect" the vapour at said vapour-exit.

7. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, a vapour-exit in the fat-collector, means to "collect" the vapour at said vapour exit, and suction means to promote the flow of hot vapours through the draining vessel.

8. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, means to "collect" the vapour at said vapour-exit, and a deodorizer interposed in the path of the vapours between the fat-collector and vapour-collecting means.

9. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, a vapour-exit in the fat-collector, means to "collect" the vapour at said vapour-exit, suction means to promote the flow of hot vapours through the draining vessel, and a deodorizer interposed in the path of the vapours between the fat-collector and vapour-collecting means.

10. Apparatus for dry-render recovery of fat from fat-yielding materials, comprising, in combination, a closed rendering vessel, a closed draining vessel to receive cracklings discharged from the rendering vessel, means placing said rendering vessel and draining vessel in controlled air-sealed communication with one another, a vapour-exit in the draining vessel so situated that the hot vapours admitted from the rendering vessel have to travel through the body of cracklings in the draining vessel, means to admit steam under pressure to the draining vessel, other means for heating the draining vessel, and means to "collect" the vapours from said vapour exit.

11. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, means to admit steam under pressure to the draining vessel, and other means for heating the draining vessel.

12. Apparatus for dry-render recovery of fat from fat-yielding materials, comprising, in combination, a closed rendering vessel, a closed draining vessel to receive cracklings discharged from the rendering vessel, a closed fat-collector, means placing these three elements in air-sealed series connection with one another, a valve in the connection between the rendering vessel and the fat collector, a valve in the connection between the rendering vessel and the draining vessel, and means for admitting live steam to draining vessel.

13. Apparatus for the carrying into effect of a dry-render process of recovery of fat from fat-yielding materials, which comprises, in combination, a closed rendering vessel, a jacketed closed draining vessel to receive cracklings discharged from the rendering vessel, which draining vessel is divided horizontally into an upper part which is steam jacketed and a lower part, a drainage grid across the top of the lower part, means of union between the two parts permitting one to be displaced relatively to the other to enable the upper part to drop its charge of cracklings, means providing a controlled air-sealed passage between the rendering vessel and the upper part of the draining vessel for the discharge thereto, without exposure to the atmosphere, of cracklings from the rendering vessel, means providing a controlled air-sealed passage for vapours produced within the rendering vessel to flow therefrom to the top of the upper part of the draining vessel, a vapour exit in the lower part of the draining vessel situated beneath the grid, means to admit steam under pressure into the draining vessel, and means to "collect" the vapours at said vapour-exit.

14. Apparatus for the carrying into effect of a dry-render process of recovery of fat from fat-yielding materials, which comprises, in combination, a closed rendering vessel, a closed draining vessel to receive cracklings discharged from the rendering vessel, which draining vessel is divided horizontally into an upper part and a lower part, a drainage grid across the top of the lower part, means of union between the two parts permitting one to be displaced relatively to the other to enable the upper part to drop its charge of cracklings, means providing a controlled air-sealed passage between the rendering vessel and the upper part of the draining vessel for the discharge thereto, without exposure to the atmosphere, of cracklings from the rendering vessel, means providing a controlled air-sealed passage for vapours produced within the rendering vessel to flow therefrom to the top of the upper part of the draining vessel, a fat-settling tank, a conduit connecting the bottom of the lower part of the draining vessel to the inlet of the fat-settling tank so that both fat draining through the grid and also vapours from the rendering vessel are caused to pass into the tank, a vapour-exit in the tank, means to "collect" the vapours at said vapour-exit, and suction means to promote the flow of vapours through the draining vessel.

15. Apparatus for the carrying into effect, of a dry-render process of recovery of fat from fat-yielding materials, which comprises, in combination, a closed rendering vessel, a closed draining vessel to receive cracklings discharged from the rendering vessel, which closed draining vessel is divided horizontally into an upper part and a lower part, a drainage grid across the top of the lower part, means of union between the two parts permitting one to be displaced relatively to the other to enable the upper part to drop its charge of cracklings, means providing a controlled air-sealed passage between the rendering vessel and the upper part of the draining vessel for the discharge thereto, without exposure to the atmosphere, of cracklings from the rendering vessel, means providing a controlled air-sealed passage for vapours produced within the rendering vessel to flow therefrom to the top of the upper part of the draining vessel, a fat-settling tank, a conduit connecting the bottom of the lower part of the draining vessel to the inlet of the fat-settling tank so that both fat draining through the grid and also vapours from the rendering vessel are caused to pass into the tank, a vapour-exit in the tank, means to "collect" the vapours at said vapour-exit, suction means to promote the flow of vapours through the closed draining vessel, and means to admit steam under pressure into the draining vessel.

In testimony whereof I affix my signature.

WILLIAM THOMAS POWLING.